(12) United States Patent
Padhye et al.

(10) Patent No.: US 10,205,635 B2
(45) Date of Patent: Feb. 12, 2019

(54) SYSTEM AND METHOD FOR DIAGNOSING DATABASE NETWORK INTEGRITY USING APPLICATION BUSINESS GROUPS AND APPLICATION EPICENTERS

(71) Applicant: FixStream Networks, Inc., San Jose, CA (US)

(72) Inventors: Sameer Padhye, Cupertino, CA (US); Adwaitanand Naryan Samant, Fremont, CA (US)

(73) Assignee: FIXSTREAM NETWORKS, INC., San Jose, CA (US)

(*) Notice: Subject to any disclaimer, the term of this patent is extended or adjusted under 35 U.S.C. 154(b) by 0 days.

(21) Appl. No.: 15/090,546

(22) Filed: Apr. 4, 2016

(65) Prior Publication Data

US 2016/0294650 A1 Oct. 6, 2016

Related U.S. Application Data

(60) Provisional application No. 62/142,225, filed on Apr. 2, 2015, provisional application No. 62/142,255, filed on Apr. 2, 2015, provisional application No. 62/158,868, filed on May 8, 2015, provisional application No. 62/193,760, filed on Jul. 17, 2015.

(51) Int. Cl.
*H04L 12/24* (2006.01)
*H04L 12/26* (2006.01)

(52) U.S. Cl.
CPC .............. *H04L 41/12* (2013.01); *H04L 41/22* (2013.01); *H04L 41/0618* (2013.01); *H04L 43/0876* (2013.01)

(58) Field of Classification Search
CPC .... G06F 11/0769; G06F 11/32–11/328; H04L 41/0618; H04L 41/12; H04L 41/22; H04L 43/0876; H04L 43/14
USPC ........................................................... 714/57
See application file for complete search history.

(56) References Cited

U.S. PATENT DOCUMENTS

| | | | | |
|---|---|---|---|---|
| 7,617,073 B2* | 11/2009 | Trinon | ........... | G06F 11/008 |
| | | | | 702/183 |
| 2004/0155899 A1* | 8/2004 | Conrad | ........... | H04L 41/12 |
| | | | | 715/736 |
| 2008/0148231 A1* | 6/2008 | Weber | ........... | G06F 11/324 |
| | | | | 717/120 |
| 2009/0059814 A1* | 3/2009 | Nixon | ........... | H04L 41/12 |
| | | | | 370/254 |

* cited by examiner

*Primary Examiner* — Joseph R Kudirka
(74) *Attorney, Agent, or Firm* — K&L Gates LLP

(57) ABSTRACT

Example methods, apparatuses, and user interfaces are presented for generation of Application Business groups and determining system health and integrity based thereon. An Application Business group is a correlated group of Applications forming a business process or business service. Each application typically has one or two central application services referred here as an Application Epicenter. After determining an Epicenter, all correlated and important application services one hop away can become part of the Application. Interfaces allow for expansion or shrinking the Application by selecting a number of hops from the Epicenter. Once these Epicenters are defined, additional graphical user interfaces display health and status data of the Application centered around the Epicenter, including any fault data to diagnose problems in the Application.

20 Claims, 14 Drawing Sheets

US 10,205,635 B2

SYSTEM AND METHOD FOR DIAGNOSING DATABASE NETWORK INTEGRITY USING APPLICATION BUSINESS GROUPS AND APPLICATION EPICENTERS

CROSS REFERENCES TO RELATED APPLICATIONS

This application claims the benefits of U.S. Provisional Application 62/142,225, filed Apr. 2, 2015, and titled "USING SPANNING TREE PROTOCOL TO DETERMINE A LAYER 2 TOPOLOGY OF AN ETHERNET TYPE NETWORK," U.S. Provisional Application 62/142,255, filed Apr. 2, 2015, and titled "SYSTEM AND METHOD FOR CREATING APPLICATION BUSINESS GROUP & APPLICATION EPICENTERS," U.S. Provisional Application 62/158,868, filed May 8, 2015, and titled "METHOD OF DISCOVERING NETWORK TOPOLOGY," and U.S. Provisional Application 62/193,760, filed Jul. 17, 2015, and titled "METHOD AND SYSTEM FOR DISTRIBUTED FAULT COLLECTION AND CORRELATION IN A VIRTUALIZED DATA CENTER NETWORK," the disclosures of which are hereby incorporated herein in their entireties and for all purposes. This application is also related to U.S. Non-provisional application Ser. No. 15/090,553, titled "USING SPANNING TREE PROTOCOL TO DETERMINE A LAYER 2 TOPOLOGY OF AN ETHERNET TYPE NETWORK," filed herewith, the disclosure of which is incorporated herein by reference in its entirety and for all purposes.

TECHNICAL FIELD

The present disclosures relate to determining network integrity through correlating of application instances to create Application epicenters and end point groups. Groups of Applications or databases may be clustered into Application epicenters, which may then be monitored on regular intervals. The applications can be created either manually or dynamically once the Application epicenter(s) have been defined.

BACKGROUND

In a network of databases and/or servers, multiple programs may be running simultaneously toward a common purpose. There may be multiple clusters of programs, with each cluster of programs operating simultaneously in and through the network of databases or servers and each for a different purpose. For each cluster of programs aligned to a common purpose, function, or grouping, it may be useful to monitor the health and status of the hardware and software components specifically used to support that cluster. However, conventional techniques may monitor the health and status of the network overall, rather than allow for monitoring of specific subsets in the network that is specifically used to support a particular cluster. In addition, graphical interfaces of conventional techniques may poorly depict relevant data for a particular cluster of programs that are of interest to a user. It is desirable therefore to develop a useful organizational structure to group pieces of information out of a network together, and to make them displayable in a useful way for monitoring the health and status of the relevant network components.

BRIEF SUMMARY

In some embodiments, a system is presented. The system may include at least one memory; at least one processor coupled to the memory and communicatively coupled to a network of computer programs operating on one or more servers. The at least one processor may be configured to: determine an application epicenter by determining which program among the computer programs interconnects with the most number of other programs in the network of computer programs; group a plurality of programs among the network of computer programs together that are one direct link to the application epicenter; identify hardware components within the one or more servers that are used to operate the plurality of programs linked around the application epicenter; determine physical links between each of the hardware components; cause display of a graphical representation of the hardware components and their physical links; and cause display of an overlay of the plurality of programs and the application epicenter over the graphical representation of the hardware components, wherein positions of the programs and application epicenter correspond to which hardware components are directly supporting operation of the programs and application epicenter.

In some embodiments of the system, the processor is further configured to determine a degree of health of each of the hardware components and their physical links by monitoring traffic flows of the physical links.

In some embodiments of the system, the processor is further configured to cause display of the health of each of the hardware components and their physical links by overlaying graphics representing the health of each of the hardware components and their physical links over their respective graphical representations.

In some embodiments of the system, the processor is further configured to cause display of a graphical representation of traffic flows between the hardware components.

In some embodiments of the system, the processor is further configured to determine that at least one hardware component has a fault.

In some embodiments of the system, the processor is further configured to cause display of the fault by overlaying a graphical representation of the fault over the graphical representation of its corresponding hardware component.

In some embodiments of the system, the processor is further configured to access a user input defining the application epicenter, and the plurality of programs is grouped based on the user input.

In some embodiments, a method is presented comprising any of the steps performed by the processor described in any of the systems recited herein.

In some embodiments, a computer readable medium having no transitory signals is presented, comprising instructions that, when executed by a processor, cause the processor to perform the steps described in the methods recited herein.

DETAILED DESCRIPTION

Example methods, apparatuses, and systems (e.g., machines) are presented for organizing programs in a network of databases and/or servers into relevant groups for a user, and for monitoring the health and status and ultimately diagnosing any faults or other problems with these programs in a displayable and efficient manner for a user. The present disclosures also remove the confusion of the definition of an Application. Various industry definitions of an "Application" include "An application is a program, or group of programs, that is designed for the end user," "An application is a software program that runs on a computer," "An application is the use of a technology, system, or product," and "An Application is a URL for business users to complete their task." The approach defined in these disclosures helps define an application as covering all the definitions. Aspects of the present disclosures also define an Application Epicenter, and allow for them to be monitored and diagnosed for any problems.

In some embodiments, an Application Epicenter may be defined as part of a method or process for monitoring relevant components in a network pertinent to a user's particular interests. As discussed more below, an Application Epicenter includes a program or application that is central to the operation of multiple other programs or applications. Each application epicenter tends to be more heavily used than other applications. In some embodiments, a process or method includes identifying which programs or applications are to be designated as an Epicenter, based on assessing traffic flow and other metadata parameters.

In some embodiments, a grouping of applications around the Epicenter may be displayable in an efficient manner to allow the user to more easily discern how programs are interconnected and which programs are critical junctures for other programs. In addition, underlying hardware components in the physical network used to operate the programs may be shown. In addition, in some embodiments, these displays may also show any fault data over the relevant components of the network. In this way, the user may easily be able to determine what programs and hardware are used to operate their applications of interest, and may be able to quickly diagnose what problems exist and where they are located that may be causing larger system failures.

Figure 1:
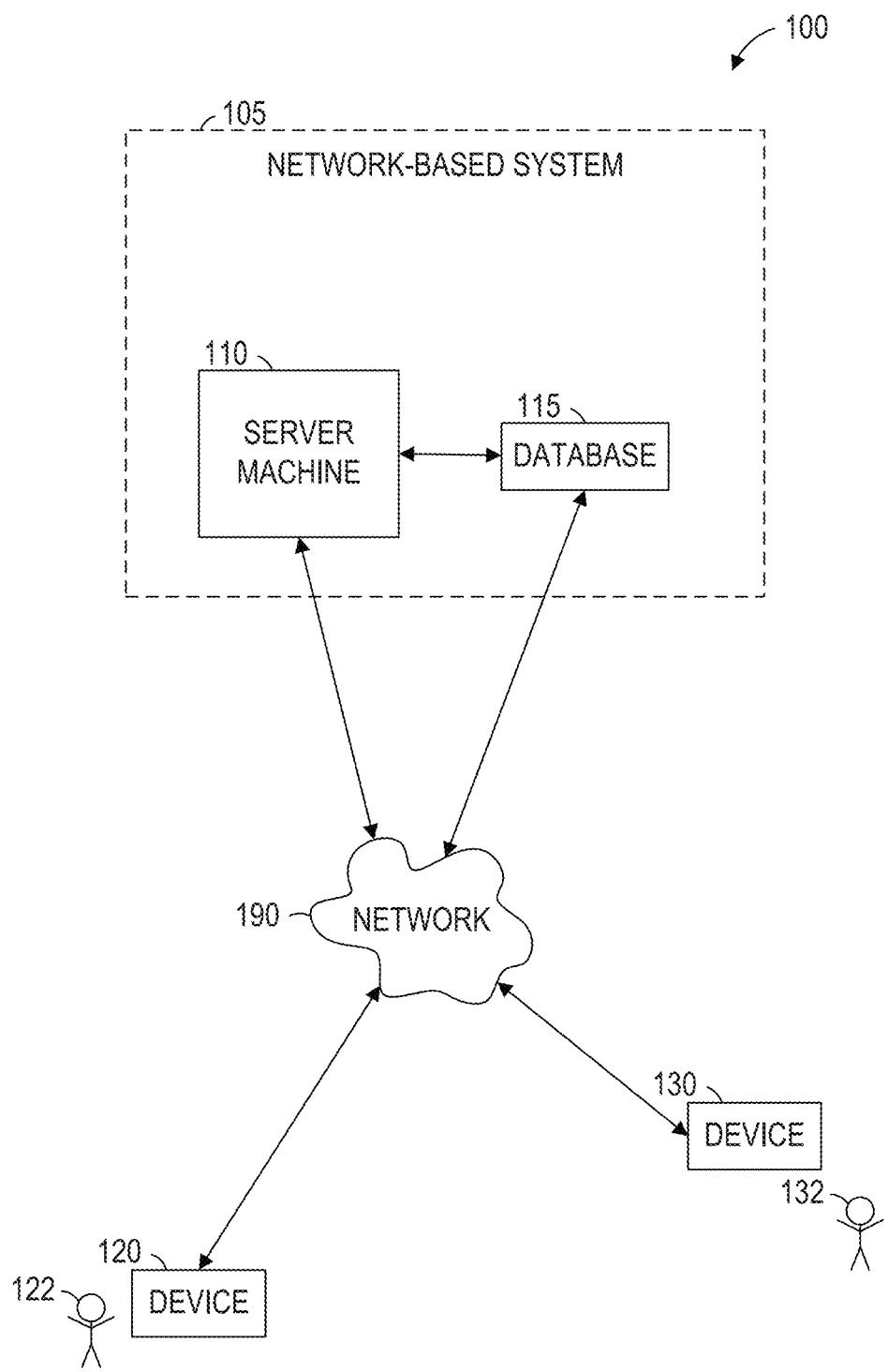
FIG. 1 shows a network diagram illustrating an example network environment suitable for performing aspects of the present disclosure, according to some example embodiments.

Referring to FIG. 1, a network diagram illustrating an example network environment 100 suitable for performing aspects of the present disclosure is shown, according to some example embodiments. The example network environment 100 includes a server machine 110, a database 115, a first device 120 for a first user 122, and a second device 130 for a second user 132, all communicatively coupled to each other via a network 190. The server machine 110 may form all or part of a network-based system 105 (e.g., a cloud-based server system configured to provide one or more services to the first and second devices 120 and 130). The server machine 110, the first device 120, and the second device 130 may each be implemented in a computer system, in whole or in part, as described below with respect to FIG. 14. The network-based system 105 may be an example of a system housing multiple databases and/or programs, some of which at least are of interest to the users 122 and 132. The server machine 110 and the database 115 may be components of an engine configured to identify application epicenters and to display the applications of interest, and their relevant hardware and software components, to the users 122 and 132 in efficient ways. While the server machine 110 is represented as just a single machine and the database 115 where is represented as just a single database, in some embodiments, multiple server machines and multiple databases communicatively coupled in parallel or in serial may be utilized, and embodiments are not so limited.

Also shown in FIG. 1 are a first user 122 and a second user 132. One or both of the first and second users 122 and 132 may be a human user, a machine user (e.g., a computer configured by a software program to interact with the first device 120), or any suitable combination thereof (e.g., a human assisted by a machine or a machine supervised by a human). The first user 122 may be associated with the first device 120 and may be a user of the first device 120. For example, the first device 120 may be a desktop computer, a vehicle computer, a tablet computer, a navigational device, a portable media device, a smartphone, or a wearable device (e.g., a smart watch or smart glasses) belonging to the first user 122. Likewise, the second user 132 may be associated with the second device 130. As an example, the second device 130 may be a desktop computer, a vehicle computer, a tablet computer, a navigational device, a portable media device, a smartphone, or a wearable device (e.g., a smart watch or smart glasses) belonging to the second user 132. The first user 122 and a second user 132 may be examples of users or customers interfacing with the network-based system 105 to utilize the display capabilities that efficiently organize the programs around application epicenters. The users 122 and 132 may interface with the network-based system 105 through the devices 120 and 130, respectively.

Any of the machines, databases 115, or first or second devices 120 or 130 shown in FIG. 1 may be implemented in a general-purpose computer modified (e.g., configured or programmed) by software (e.g., one or more software modules) to be a special-purpose computer to perform one or more of the functions described herein for that machine, database 115, or first or second device 120 or 130. For example, a computer system able to implement any one or more of the methodologies described herein is discussed below with respect to FIG. 14. As used herein, a "database" may refer to a data storage resource and may store data structured as a text file, a table, a spreadsheet, a relational database (e.g., an object-relational database), a triple store, a hierarchical data store, any other suitable means for organizing and storing data or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases 115, and devices (e.g., the server machine 110 and the first device 120). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include, for example, one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" may refer to any intangible (e.g., transitory) medium that is capable of communicating (e.g., transmitting) instructions for execution by a machine (e.g., by one or more processors of such a machine), and can include digital or analog communication signals or other intangible media to facilitate communication of such software.

Figure 2:
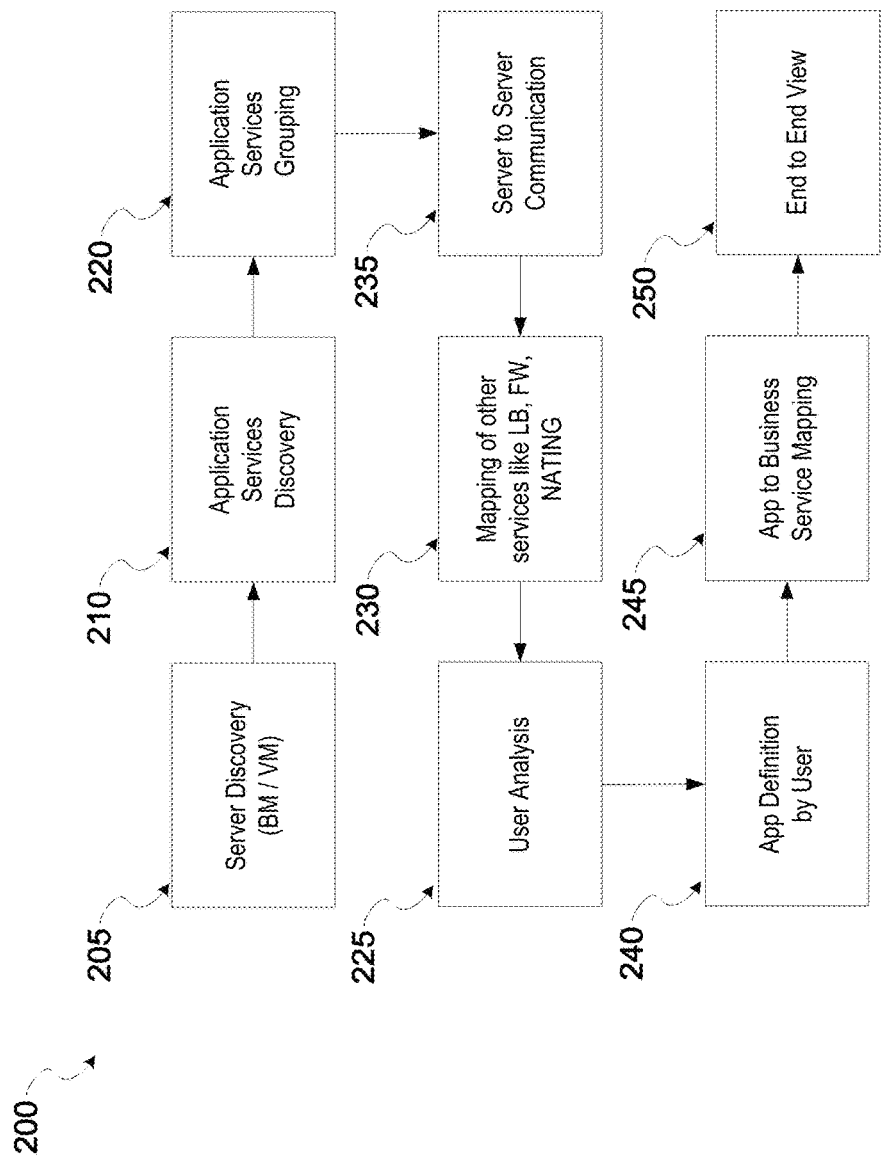
FIG. 2 shows a complete process of creating applications and defining an application hierarchy, according to some embodiments.

FIG. 2 shows a complete process of creating applications and defining an application hierarchy. An application hierarchy may refer to a tiered organization of programs, where higher levels in the hierarchy include multiple grouped programs from a lower level, and so on for lower levels in the hierarchy. An example is described in FIG. 8. The platform, such as the network-based system 102, discovers all the servers within the data center via different access methods like ssh, telnet, etc. As part of the discovery process, the platform may first discover what servers are available, both virtual and bare metal machines (VMs and BMs) at step 205, the platform may collect different application services 210 (Oracle, MySQL database. TOMCAT, WebLogic Application server etc.) running on these servers and flows between these servers. The platform may also group these services at step 220. The platform may then perform server to server communications at step 235 to verify connectivity.

The discovery process also identifies other assets in the datacenter like load balancers, firewalls, etc., inline to the flows, at step 230. Once this data is collected, the system presents this data to a user for further analysis at step 225, to allow the user, at step 240, with very little to no modifications, to create an application. Once an application is created, the user can logically group applications supporting their business groups/services to create a hierarchy to represent their real life business models. The platform may then map all business services to these applications in a mapping, at step 245. The process may then end at step 250 with a displayable view of these applications.

Figure 3:
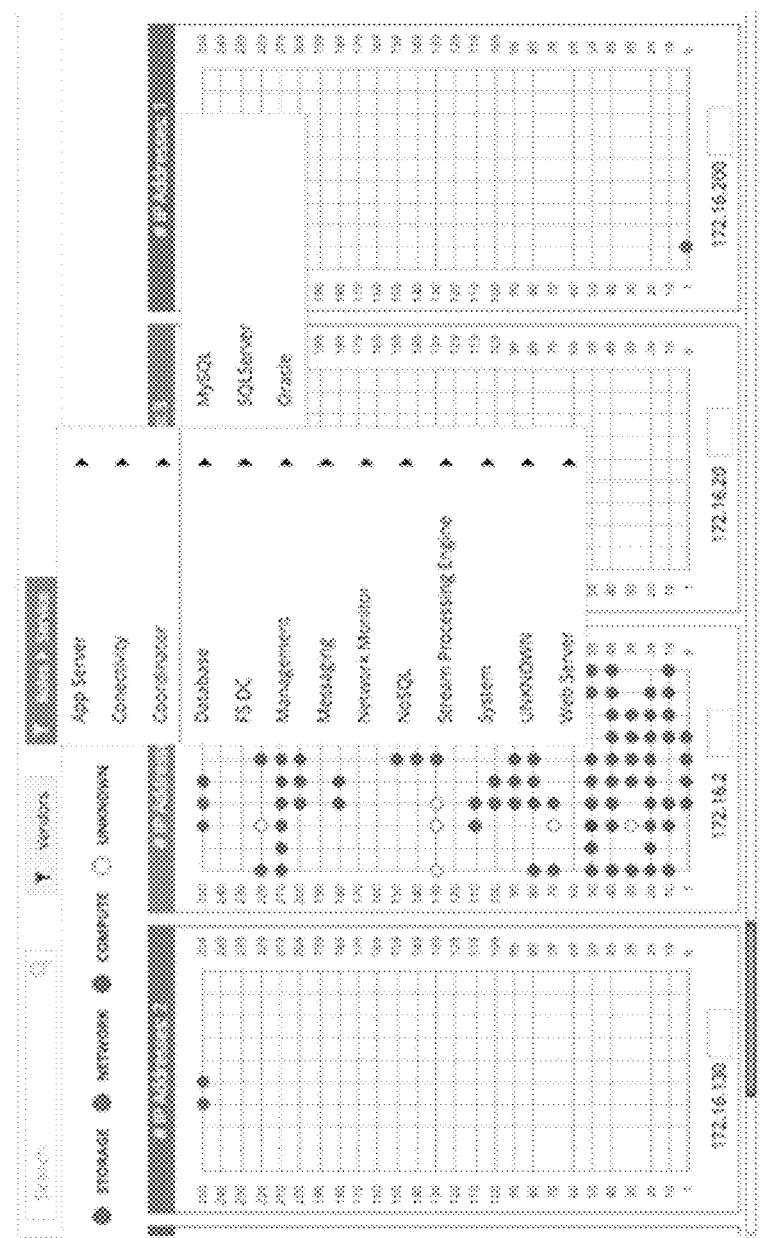
FIGS. 3 and 4 are examples showing certain data being collected for an application definition, according to some embodiments.
Figure 4:
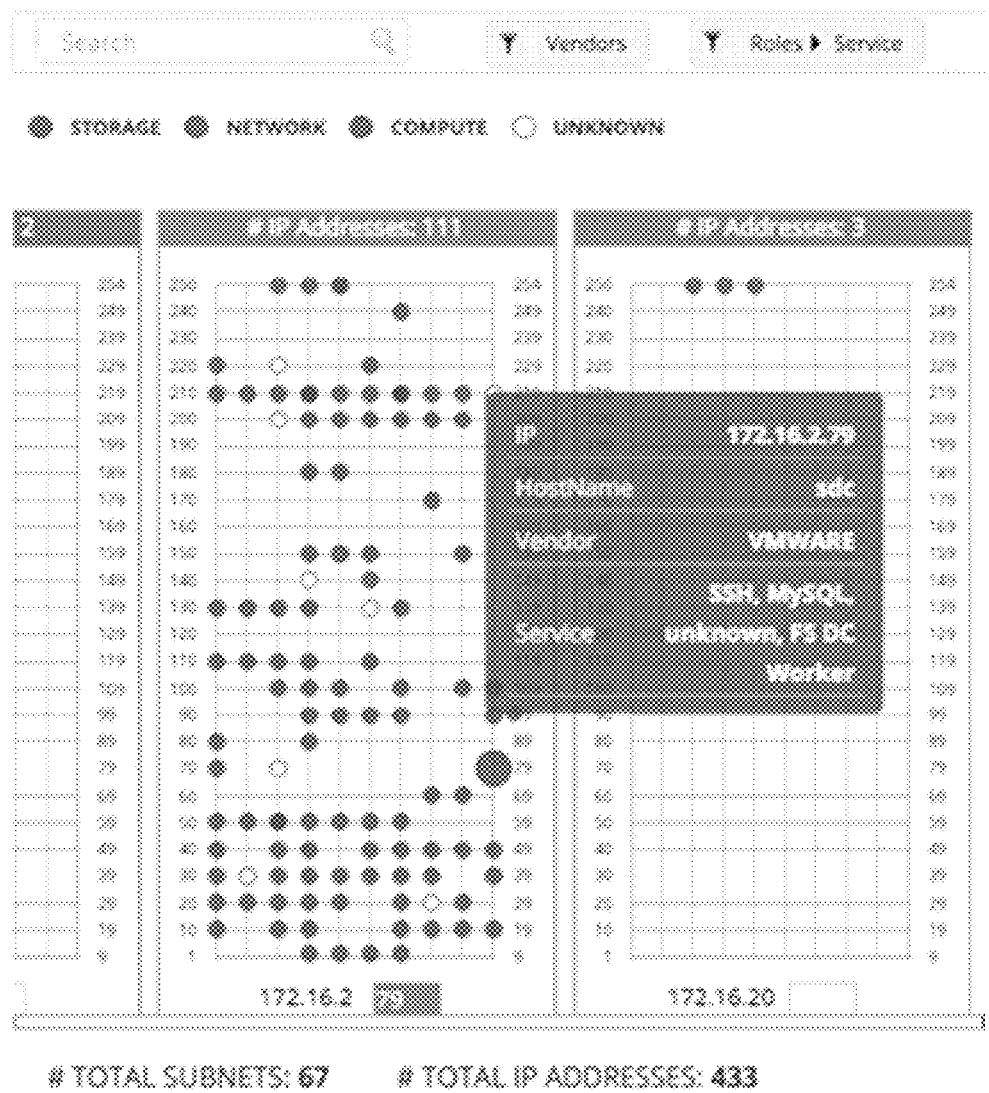

FIGS. 3 and 4 show key data being collected for an application definition. It exactly shows what application services, as mentioned above, are running, and on what virtual and bare metal machines (VMs and BMs). Some of the parameters used to identify the application services include listening ports and processes running on the server. From this data, one or multiple roles like database, application server, web server, etc., are assigned to servers.

For the best results, it is recommended that this process be executed once in a day for any newly added servers and then on a weekly basis to capture any changes in the steady state. This helps identify new applications on an ongoing basis. As part of data collection and data normalization, the correlation engine logically groups application services. As an example, multiple nodes of Cassandra will be grouped as one cluster, multiple MySQL instances will be grouped as MySQL RAC database, etc. This helps in application monitoring and application definition and reduces burden on the user to group them together for any future consumption. Once all the servers are scanned and analyzed, the FS data collector starts gathering traffic patterns flowing between the servers. The system may use tcpdump/windump or netstat commands for example, depending on user preference, to collect flow data. The system has an ability to integrate with 3rd party tools to collect this data in case the customer has already deployed them for network analysis or monitoring. The data quality and analysis will be richer if the data is collected more frequently. There could be situations where the application is invoked during a certain period of the day/week/month/quarter, and at times it may take some time to identify this communication and hence the application discovery.

The application services (e.g., database, application server, web servers, etc.) are identified against a repository, which may come bundled as part of a product that encapsulates embodiments of the present disclosure. This repository acts as single source of truth. If and when new application services get introduced or missing services are identified, the system makes an attempt to update this repository and publish the service patch as soon as possible. The user can also update the repository as per needs and define application services and in turn applications to meet organization requirements.

Figure 5:
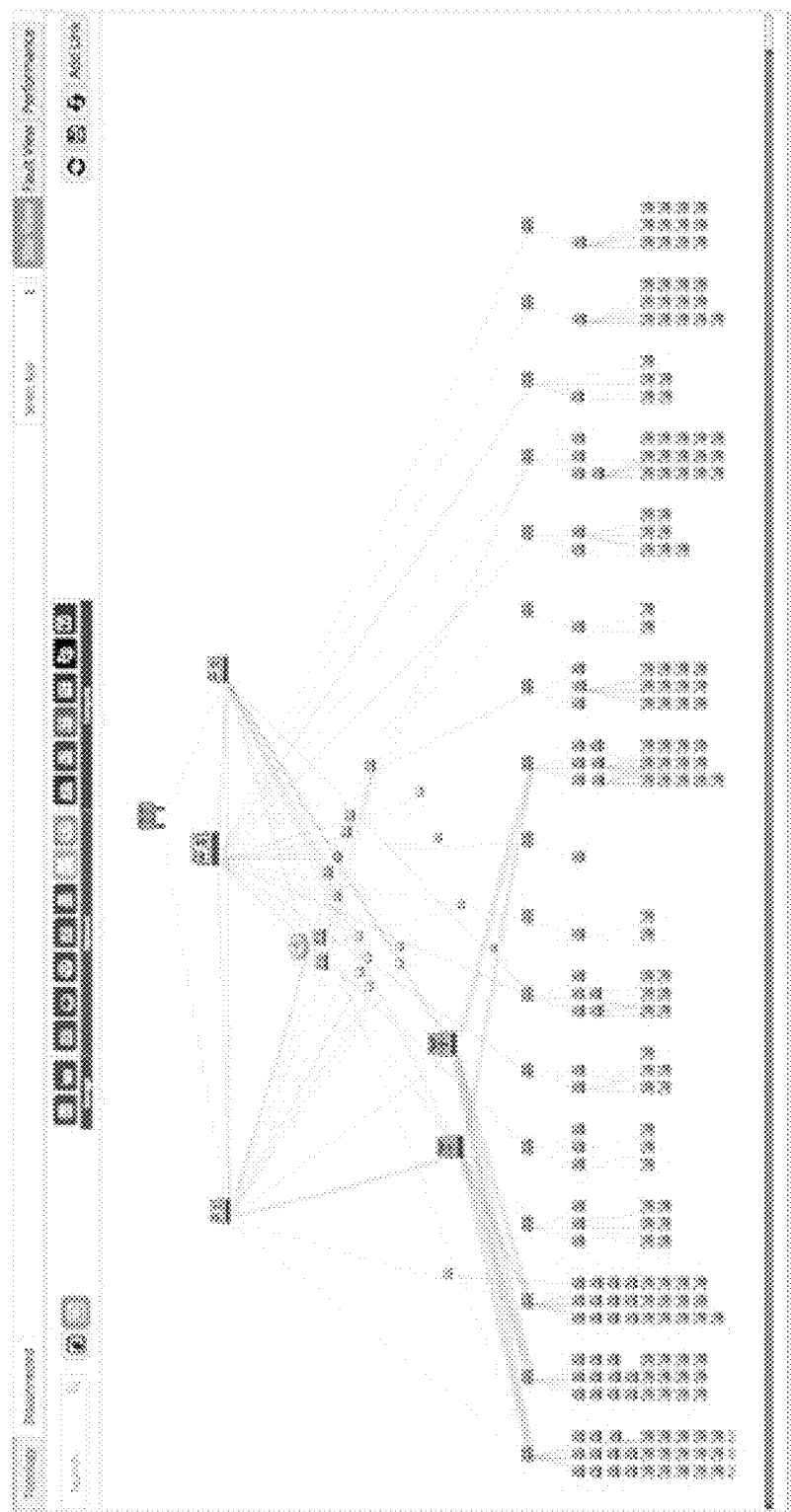
FIG. 5 shows how data collected for other data center assets like load balancers, firewalls, storage, etc., is correlated to build a "Data Center Physical Topology" of the data center, according to some embodiments.

In addition, FIG. 5 shows how data collected for other data center assets like load balancers, firewalls, storage, etc., is correlated to build a "Data Center Physical Topology" of the data center. Refer to U.S. Provisional Patent application "U.S. 62/142,225," which is incorporated herein by reference, for more details. The referred patent application explains a method of data collection and correlation from network devices to form a "Data Center Physical Topology" mapping.

Figure 6:
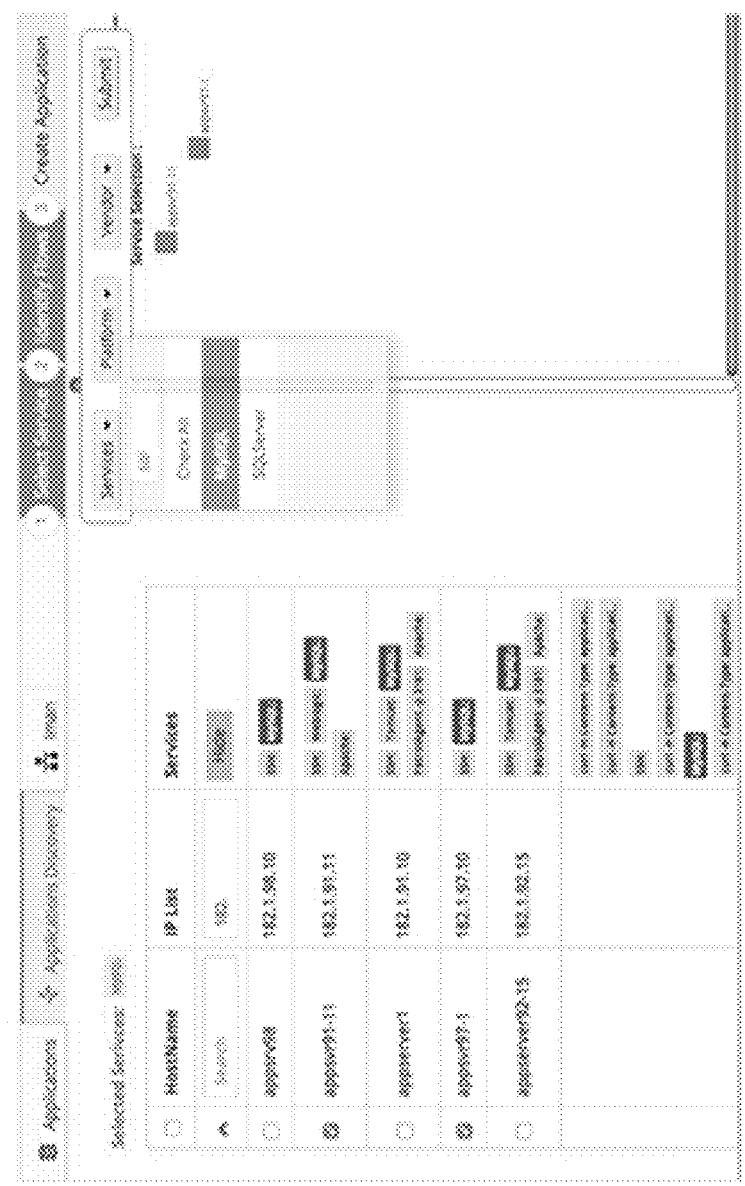
FIGS. 6 and 7 explain the concept of Application Discovery via Application Epicenter and Application Services.
Figure 7:
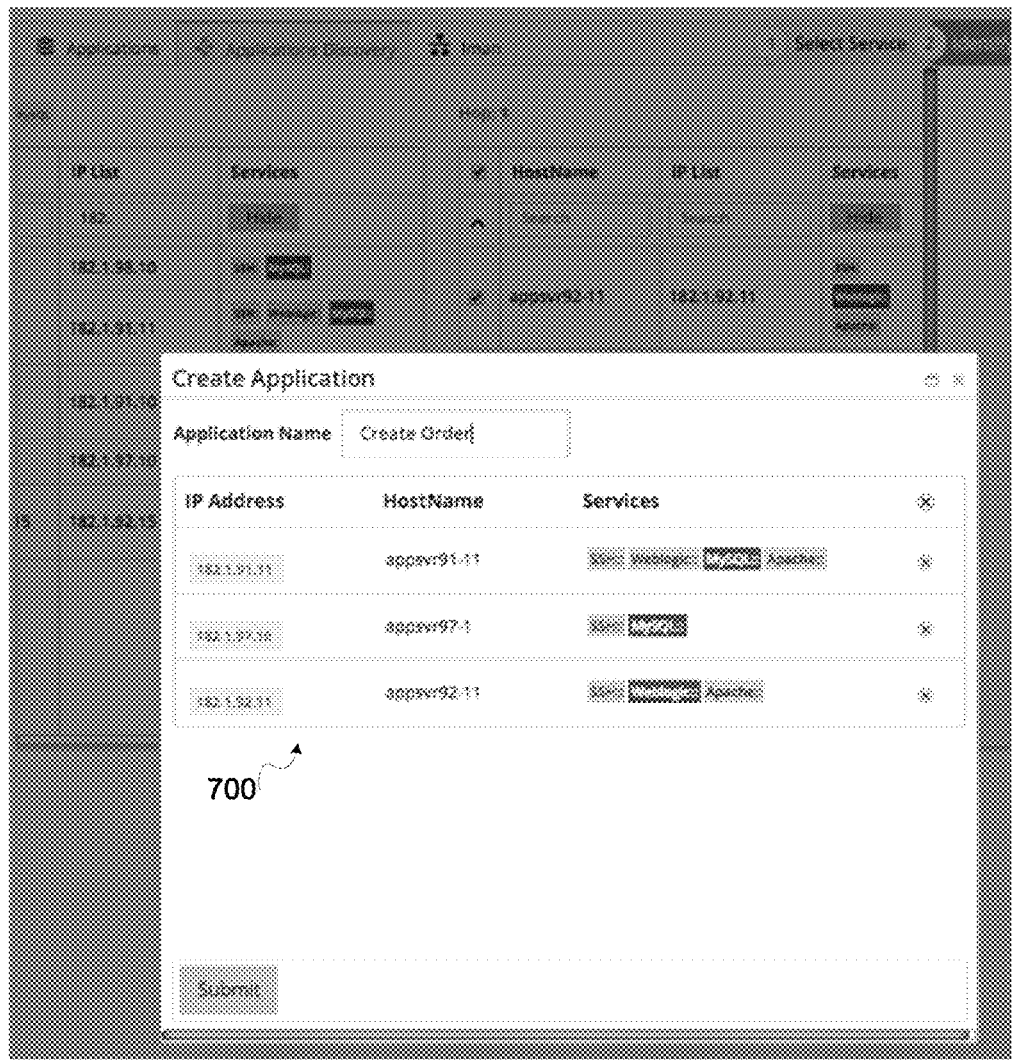

FIGS. 6 and 7 explain the concept of Application Discovery via Application Epicenter and Application Services. In the context of Application Discovery, application services are individual software components that are bundled together to build an application.

The system helps users define applications via its rich user interface. The system is able to determine EPICENTERS, which are application services that are most heavily used or critical to application. A user can select this service and start building an application via simple clicks. Once the user selects an EPICENTER (e.g. MySQL database), the system will show all the application services that are one hop (e.g. application servers, another databases), two hops (web servers) or whatever number of hops the user wants from the EPICENTER. The user can then save the application. While doing this, the user can deselect common services, and group common services into another application or logical groups. The system will automatically align application services depending on out of box or user defined roles like database, app server, and web server, or create more logical groups. In addition, the user can simply choose to group any number of application services and define their own application.

The different operations team can use this feature to their advantage. An example use case of this will be a MYSQL DBA group can simply select all the MYSQL databases identified under one group and set up monitoring. DBAs can even create logical groups like P1 DBs, P2 DBs and accordingly group databases.

Figure 8:
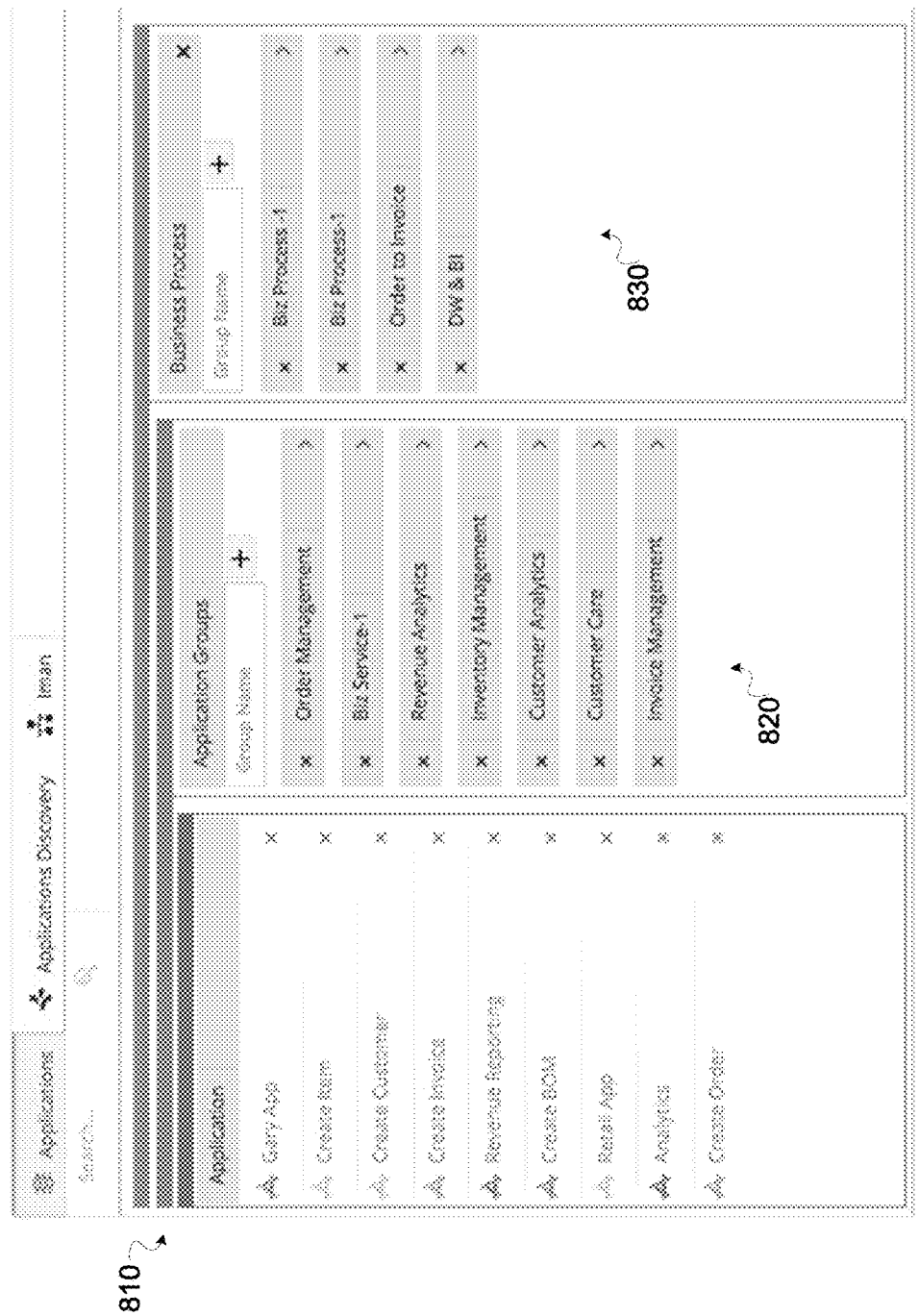
FIG. 8 demonstrates an Application to Business Service Mapping process, according to some embodiments.

FIG. 8 demonstrates an Application to Business Service Mapping process. After applications are created, the system allows simple UI edits to further group these applications logically to represent different business processes/business services in the organization. Creating these business process/service is a matter of a few clicks and can help represent real business models for organizations.

Figure 9:
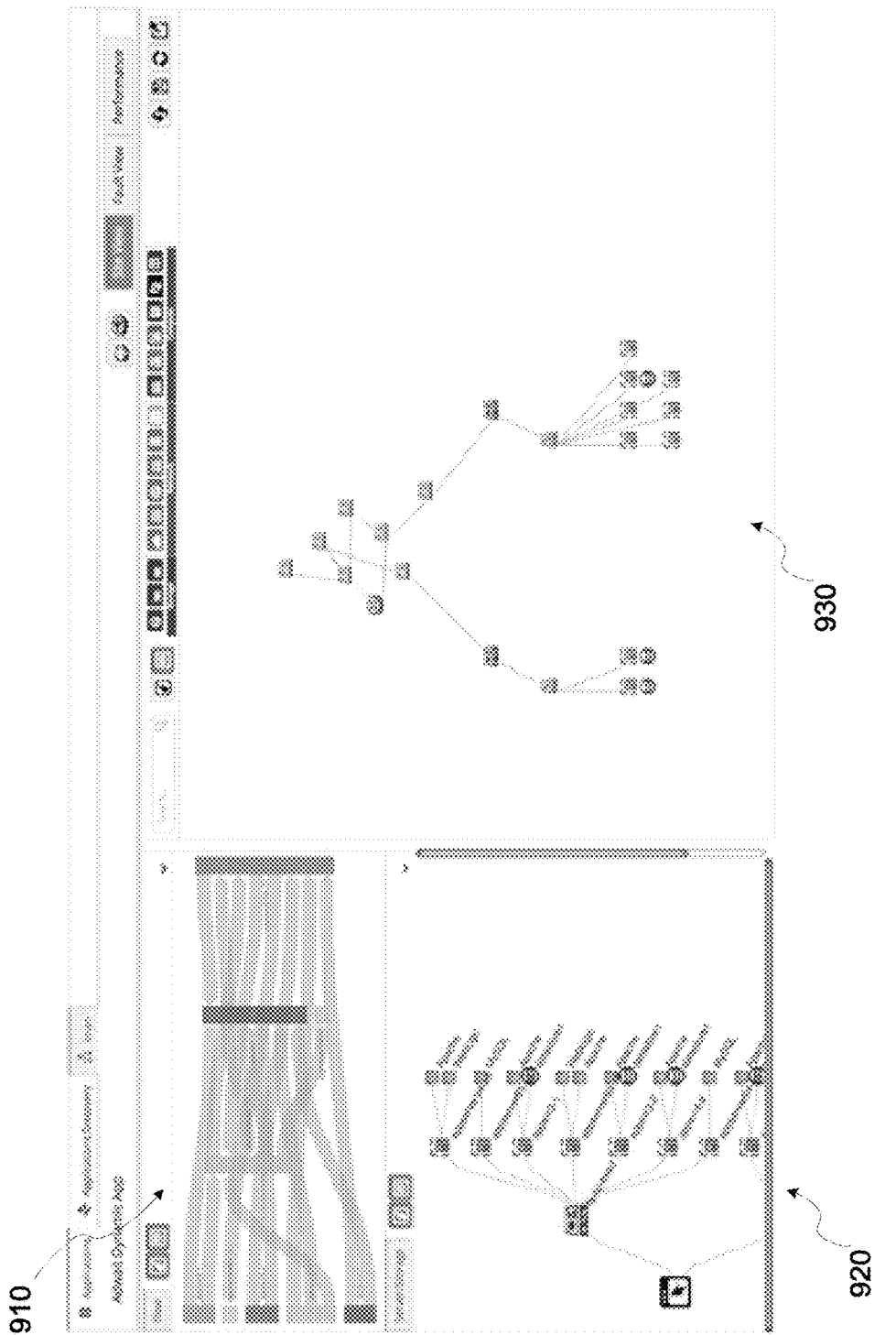
FIG. 9 demonstrates how the system offers end-to-end visibility of infrastructure for a given application, according to some embodiments.

FIG. 9 demonstrates how the system offers end-to-end visibility of infrastructure for a given application. What the system has done here is, by simply allowing an application developer to group his applications services, the system can then display a pulled end-to-end infrastructure view.

Flow window 910 shows different data flows for the application. The curved lines with arrows at the end show direction of flow from one service in the application to another. The services are represented by the various vertical bars. Server and Storage window 920 shows underlying storage and compute (Hypervisors+VM and/or Bare Metals) components supporting these flows. The window 930 on right goes further to pull in network devices and its connectivity with storage and compute components. In short, this is combined view of IaaS (Infrastructure as a Service) and PaaS (Platform as a Service) for application.

This view is built using the functionalities described in the FIGS. 5, 6, 7, and 8.

Figure 10:
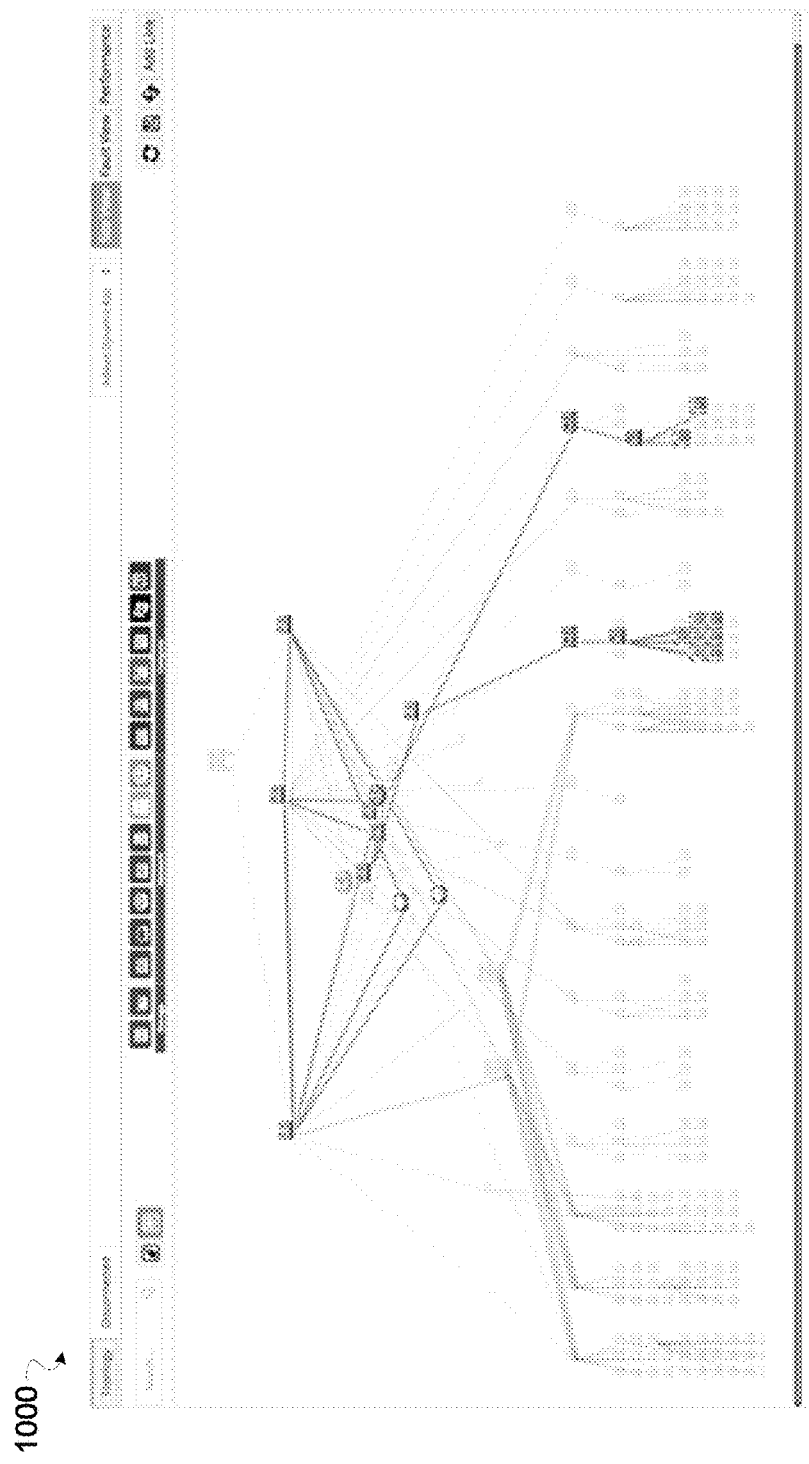
FIG. 10 shows an overlay concept to the end display of FIG. 9, according to some embodiments.

As described in the descriptions of FIGS. 2, 3, and 4, the discovery process has already gathered the flows, compute (Hypervisors+VM and/or Bare Metals) and network details. The data gathered in discrete chunks is correlated in the "Data Center Physical Topology" view as described in the descriptions of FIG. 5. When a user creates an application, the system now knows which servers to look for and narrows down from the "Data Center Physical Topology" to "Application Physical Topology"—the exact assets used by an application in the data center. One example algorithm for completing this is the same as covered in US Provisional Patent Application "U.S. 62/142,225," as described above and again is incorporated by reference. In short, it can be understood that the "Application Physical Topology" is zooming in on "Data Center Physical Topology." FIG. 10 shows this overlay concept. FIG. 10 is an overlay of the "Application Physical Topology" in right window 930 of FIG. 9 over the "Data Center Physical Topology" in FIG. 5.

Figure 11:
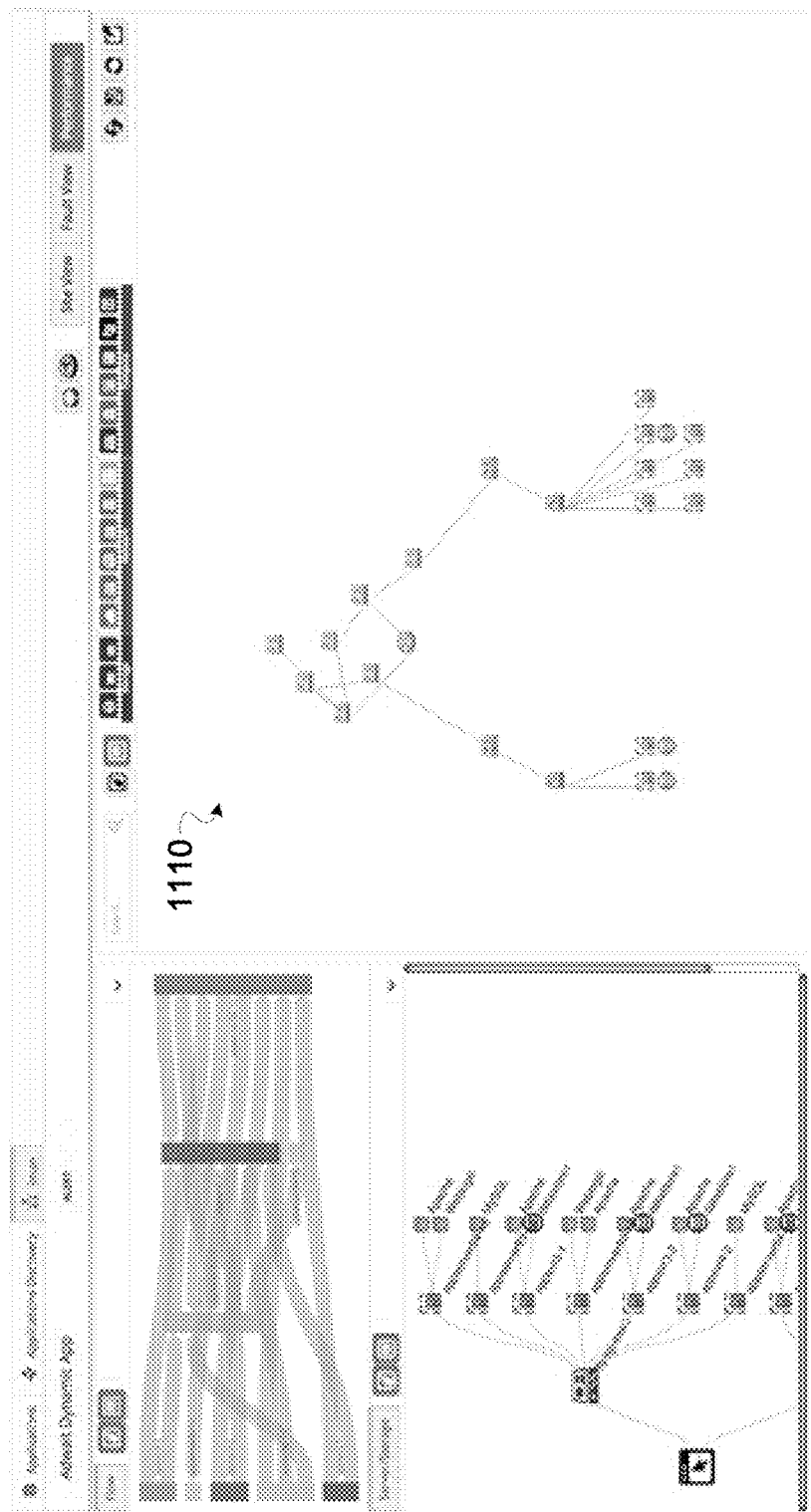
FIG. 11 shows an example of fault data overlay to the end display of FIG. 9, according to some embodiments.

Once these maps are built, the system may be configured to overlay fault and performance data on each component, for example in the right window 930. The fault data is collected via SNMP traps set up in the data center for IaaS devices (network, storage and server), and performance data is collected via metrics monitoring for IaaS devices (network, storage and server) and application services like Oracle, MySQL, TOMCAT etc. Refer to FIG. 11 for an example showing the fault data in the right window 1110.

This gives data center operators, command center operators, developers and even end business users a single pane to view the health of their applications/business processes.

Figure 12:
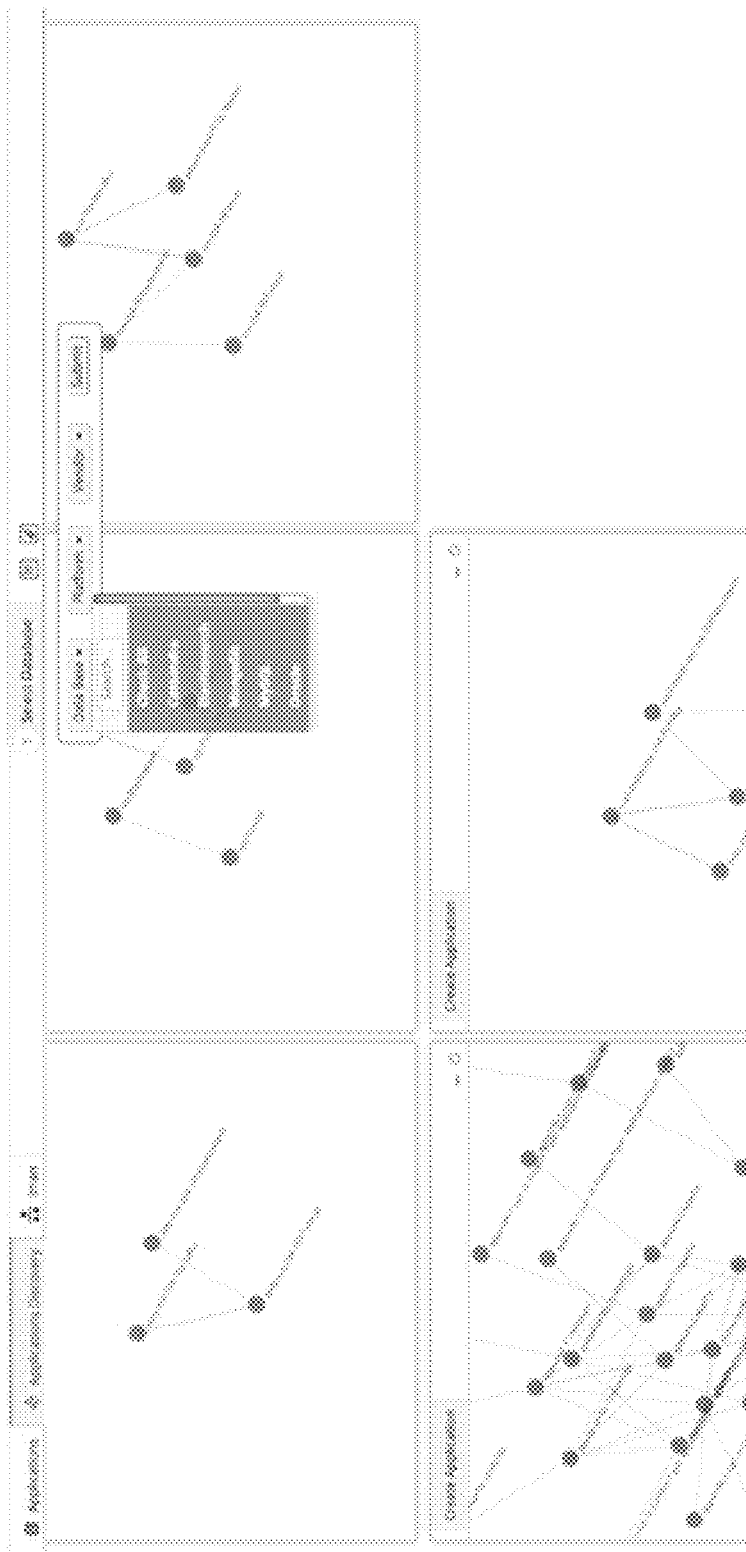
FIG. 12 demonstrates end-to-end automation of the application creation process described in previous figures, according to some embodiments.

FIG. 12 demonstrates end-to-end automation of the application creation process described in previous steps, above. In this case, instead of a user selecting EPICENTER of every application and finding relevant services, the user can simply select a platform/service type and system comes back with suggested applications. The user can then simply save the application by clicking on Create Application button. This is the outcome of intelligent analytics on the flow data collected.

Figure 13:
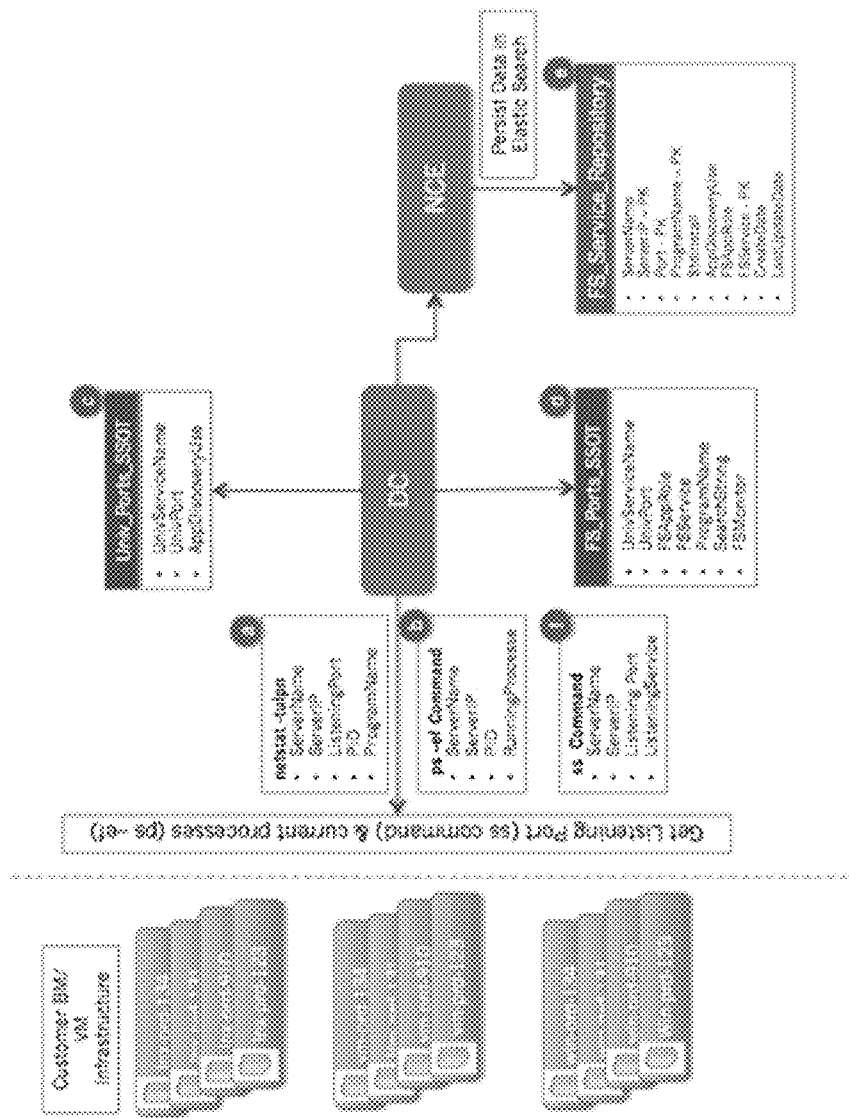
FIG. 13 shows a graphical representation of a process flow for implementing some aspects of the present disclosure.

The following pseudocode is an example representing the flow chart in FIG. 13:

```
e.ServerName = a.ServerName
e.ServerIP = a.ServerIP
e.Port = a.ListeningPort
e.ProgramName = a.ProgramName
Condition 1:
(e.Port, e.ProgramName) IN (d.UnivPort, d.ProgramName) AND
d.SearchString IS NULL THEN
    e.StdInstall = "YES"
    e.AppDiscoveryUse = "Y"
    e.FSAppRole = d.FSAppRole
    e.FSService = d.FSService
    RETURN
Condition 2:
(e.Port, e.ProgramName) IN (d.UnivPort, d.ProgramName) AND
d.SearchString IS NOT NULL THEN
    Check what process is attached to this a.PID
    perocessString = ps -ef | grep a.PID
    For every d.UnivPort, d.ProgramName check which d.SearchString
exists in perocessString
    The one with the match is actually running and so
    e.StdInstall = "YES"
    e.AppDiscoveryUse = "Y"
    e.FSAppRole = d.FSAppRole
    e.FSService = d.FSService
    RETURN
    IF none of the SearchString matches then
    e.StdInstall = "NO"
    e.AppDiscoveryUse = "Y"
    e.FSAppRole = NULL
    e.FSService = NULL
    RETURN
CONDITION 3:
IF e.ProgramName IN d.ProgramName AND d.SearchString IS NULL
THEN
    e.StdInstall = "YES"
    e.AppDiscoveryUse = "Y"
    e.FSAppRole = d.FSAppRole
    e.FSService = d.FSService
    RETURN
CONDITION 4:
IF e.ProgramName IN d.ProgramName AND d.SearchString IS NOT
NULL THEN
    Check what process is attached to this a.PID
    perocessString = ps -ef | grep a.PID
    For every d.UnivPort, d.ProgramName check which d.SearchString
exists in perocessString
    The one with the match is actually running and so
    e.StdInstall = "NO"
    e.AppDiscoveryUse = "Y"
    e.FSAppRole = d.FSAppRole
    e.FSService = d.FSService
    RETURN
    IF none of the SearchString matches then
    e.StdInstall = "NO"
    e.AppDiscoveryUse = "Y"
    e.FSAppRole = NULL
    e.FSService = NULL
    RETURN
CONDITION 5:
Catch all - Nothing could be driven out of FS_Ports_SSOT
    e.FSAppRole = NULL
    e.FSService = NULL
    Check f.ListeningService running for e.Port
    ss -a -n & ss -a
    If (f.ListeningService, e.Port) IN (c.UnivServiceName, c.UnivPort)
    THEN
        e.StdInstall = "YES"
        e.AppDiscoveryUse = c.AppDiscoveryUse
    ELSE
        e.StdInstall = "NO"
        e.AppDiscoveryUse = "YES"
    END IF
```

The following demonstrates the Application Discovery process along with sample Pseudo code:

```
Rule: 1
IF a.TargetServerIP NOT IN c.ServerIP THEN
    Ignore this connection, as server is not yet discovered
    Write to error log and schedule target server for discovery
END IF
Rule: 2
IF a.SourceServerIP NOT IN c.ServerIP THEN
    Ignore this connection, as connection is not from Data Center
    This eliminates all the connections from laptops, desktops etc from
    support guys
    This eliminates all the connections from laptops, desktops etc from
    app developers
    This eliminates all the connections from other sources like google,
    search engines etc.
END IF
IF a.TargetServerIP IN b.ServerIP THEN
    Rule: 3
    IF a.TargetPort IN b.Port THEN
        Rule: 4
        IF b.AppDiscoveryUse = "Y" THEN
            Keep this entry as part of app auto discovery
        ELSE
            Ignore this entry as part of app auto discovery
        END IF
    ELSE
        New port is listening and not yet discovered
        Write to error log and schedule target server for discovery
    END IF
END IF
```

Figure 14:
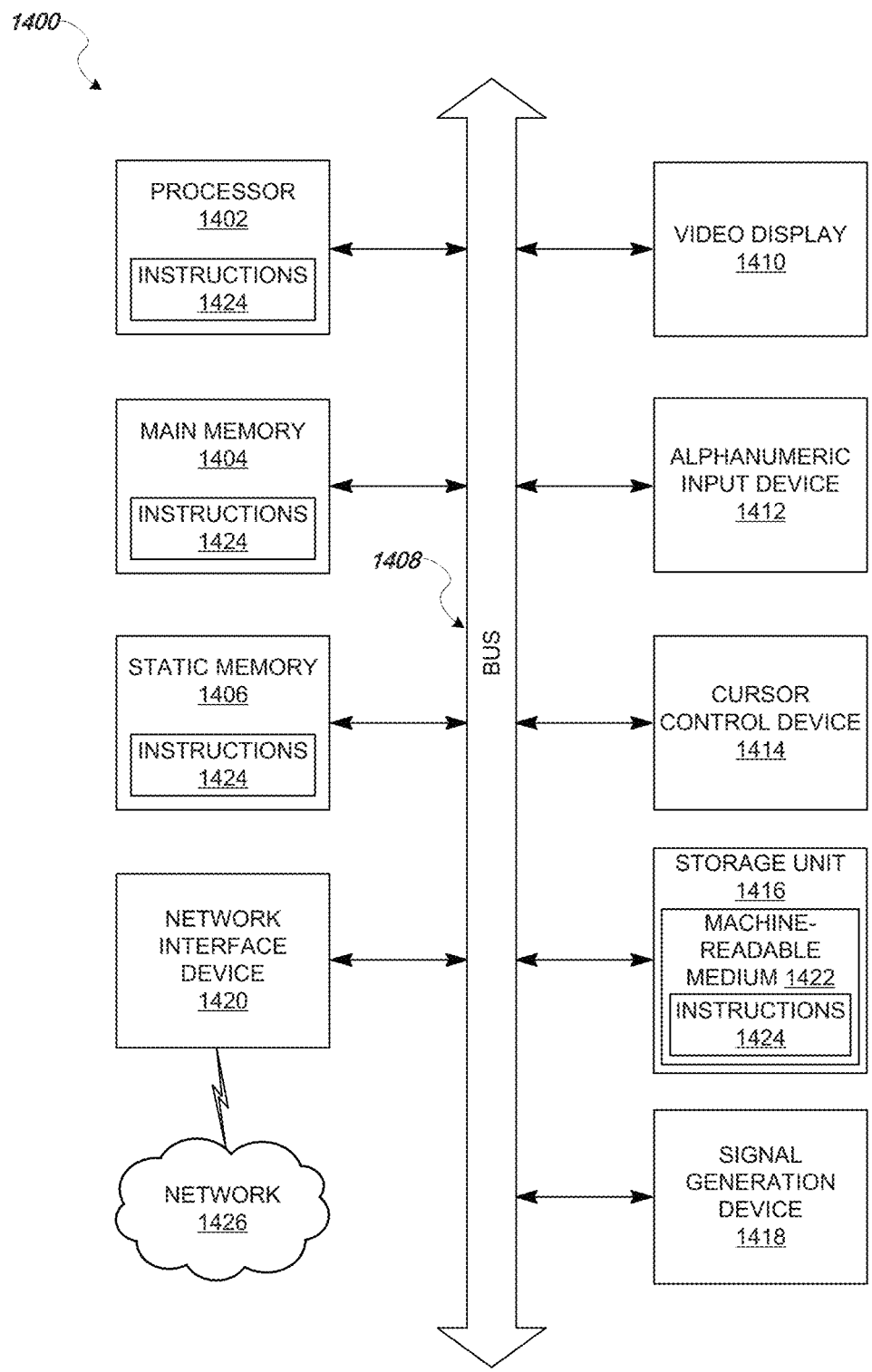
FIG. 14. is a block diagram illustrating components of a machine, according to some example embodiments, able to read instructions from a machine-readable medium and perform any one or more of the methodologies discussed herein.

Referring to FIG. 14, the block diagram illustrates components of a machine 1400, according to some example embodiments, able to read instructions 1424 from a machine-readable medium 1422 (e.g., a non-transitory machine-readable medium, a machine-readable storage medium, a computer-readable storage medium, or any suitable combination thereof) and perform any one or more of the methodologies discussed herein, in whole or in part. Specifically, FIG. 14 shows the machine 1400 in the example form of a computer system (e.g., a computer) within which the instructions 1424 (e.g., software, a program, an application, an applet, an app, or other executable code) for causing the machine 1400 to perform any one or more of the methodologies discussed herein may be executed, in whole or in part.

In alternative embodiments, the machine 1400 operates as a standalone device or may be connected (e.g., networked) to other machines. In a networked deployment, the machine 1400 may operate in the capacity of a server machine 110 or a client machine in a server-client network environment, or as a peer machine in a distributed (e.g., peer-to-peer) network environment. The machine 1400 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1424, sequentially or otherwise, that specify actions to be taken by that machine. Further, while only a single machine 1400 is illustrated, the term "machine" shall also be taken to include any collection of machines that individually or jointly execute the instructions 1424 to perform all or part of any one or more of the methodologies discussed herein.

The machine 1400 includes a processor 1402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1404, and a static memory 1406, which are configured to communicate with each other via a bus 1408. The processor 1402 may contain microcircuits that are configurable, temporarily or permanently, by some or all of the instructions 1424 such that the processor 1402 is configurable to perform any one or more of the methodologies described herein, in whole or in part. For example, a set of one or more microcircuits of the processor 1402 may be configurable to execute one or more modules (e.g., software modules) described herein.

The machine 1400 may further include a video display 1410 (e.g., a plasma display panel (PDP), a light emitting diode (LED) display, a liquid crystal display (LCD), a projector, a cathode ray tube (CRT), or any other display capable of displaying graphics or video). The machine 1400 may also include an alphanumeric input device 1412 (e.g., a keyboard or keypad), a cursor control device 1414 (e.g., a mouse, a touchpad, a trackball, a joystick, a motion sensor, an eye tracking device, or other pointing instrument), a storage unit 1416, a signal generation device 1418 (e.g., a sound card, an amplifier, a speaker, a headphone jack, or any suitable combination thereof), and a network interface device 1420.

The storage unit 1416 includes the machine-readable medium 1422 (e.g., a tangible and non-transitory machine-readable storage medium) on which are stored the instructions 1424 embodying any one or more of the methodologies or functions described herein, including, for example, any of the descriptions of FIGS. 1a-3. The instructions 1424 may also reside, completely or at least partially, within the main memory 1404, within the processor 1402 (e.g., within the processor's cache memory), or both, before or during execution thereof by the machine 1400. The instructions 1424 may also reside in the static memory 1406.

Accordingly, the main memory 1404 and the processor 1402 may be considered machine-readable media 1422 (e.g., tangible and non-transitory machine-readable media). The instructions 1424 may be transmitted or received over a network 1426 via the network interface device 1420. For example, the network interface device 1420 may communicate the instructions 1424 using any one or more transfer protocols (e.g., HTTP). The machine 1400 may also represent example means for performing any of the functions described herein, including the processes described in FIGS. 1a-3.

In some example embodiments, the machine 1400 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1422 able to store data temporarily or permanently and may be taken to include, but not be limited to, random-access memory (RAM), read-only memory (ROM), buffer memory, flash memory, and cache memory.

While the machine-readable medium 1422 is shown in an example embodiment to be a single medium, the term "machine-readable medium" should be taken to include a single medium or multiple media (e.g., a centralized or distributed database 115, or associated caches and servers) able to store instructions 1424. The term "machine-readable medium" shall also be taken to include any medium, or combination of multiple media, that is capable of storing the instructions 1424 for execution by the machine 1400, such that the instructions 1424, when executed by one or more processors of the machine 1400 (e.g., processor 1402), cause the machine 1400 to perform any one or more of the methodologies described herein, in whole or in part. Accordingly, a "machine-readable medium" refers to a single storage apparatus or device 120 or 130, as well as cloud-based storage systems or storage networks that include multiple storage apparatus or devices 120 or 130. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 1422 is non-transitory in that it does not embody a propagating signal. However, labeling the tangible machine-readable medium 1422 as "non-transitory" should not be construed to mean that the medium is incapable of movement; the medium should be considered as being transportable from one physical location to another. Additionally, since the machine-readable medium 1422 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 1422 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1402 or a group of processors 1402) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 1402 or other programmable processor 1402. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 1408) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1402 that are temporarily configured (e.g., by software) or permanently configured to perform the relevant operations. Whether temporarily or permanently configured, such processors 1402 may constitute processor-implemented modules that operate to perform one or more operations or functions described herein. As used herein, "processor-implemented module" refers to a hardware module implemented using one or more processors 1402.

Similarly, the methods described herein may be at least partially processor-implemented, a processor 1402 being an example of hardware. For example, at least some of the operations of a method may be performed by one or more processors 1402 or processor-implemented modules. As used herein, "processor-implemented module" refers to a hardware module in which the hardware includes one or more processors 1402. Moreover, the one or more processors 1402 may also operate to support performance of the relevant operations in a "cloud computing" environment or as a "software as a service" (SaaS). For example, at least some of the operations may be performed by a group of computers (as examples of machines 1400 including processors 1402), with these operations being accessible via a network 1426 (e.g., the Internet) and via one or more appropriate interfaces (e.g., an API).

The performance of certain operations may be distributed among the one or more processors 1402, not only residing within a single machine 1400, but deployed across a number of machines 1400. In some example embodiments, the one or more processors 1402 or processor-implemented modules may be located in a single geographic location (e.g., within a home environment, an office environment, or a server farm). In other example embodiments, the one or more processors 1402 or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine 1400 (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A system comprising:
   at least one memory; and
   at least one hardware processor coupled to the at least one memory and communicatively coupled to a network of computer programs operating on one or more servers, the at least one hardware processor configured to:
   connect to listening ports running on the one or more servers;
   receive data from the listening ports;
   responsive to receiving the data, determine an application epicenter by determining which program among the computer programs interconnects with the most number of other programs in the network of computer programs based on verifying a data communication between a dynamic port associated with said program and listening ports associated with one or more of the other programs;
   group a plurality of programs among the network of computer programs together that are one direct link to the application epicenter;
   identify hardware components within the one or more servers that are used to operate the plurality of programs that are one direct link to the application epicenter;
   determine physical links between each of the hardware components;
   cause display of a graphical representation of the hardware components and their physical links in a digital display; and
   cause display of an overlay of the plurality of programs and the application epicenter over the graphical representation of the hardware components in the digital display, wherein positions of the programs and application epicenter correspond to which hardware components are directly supporting operation of the programs and application epicenter.

2. The system of claim 1, wherein the processor is further configured to:
   determine a degree of health of each of the hardware components and their physical links by monitoring traffic flows of the physical links.

3. The system of claim 2, wherein the processor is further configured to:
   cause display of the degree of health of each of the hardware components and their physical links by overlaying graphics representing the degree of health of each of the hardware components and their physical links over their respective graphical representations.

4. The system of claim 1, wherein the processor is further configured to:
   cause display of a graphical representation of traffic flows between the hardware components.

5. The system of claim 1, wherein the processor is further configured to:
   determine that at least one hardware component has a fault.

6. The system of claim 5, wherein the processor is further configured to:
   cause display of the fault by overlaying a graphical representation of the fault over the graphical representation of its corresponding hardware component.

7. The system of claim 1, wherein the processor is further configured to access a user input defining the application epicenter, and the plurality of programs is grouped based on the user input.

8. A computer-implemented method of at least one hardware processor coupled to a memory and communicatively coupled to a network of computer programs operating on one or more servers, the method comprising:
   connecting, by the at least one hardware processor, to listening ports running on the one or more servers;
   receiving, by the at least one hardware processor, data from the listening ports;
   responsive to receiving the data, determining, by the at least one hardware processor, an application epicenter by determining which program among the computer programs interconnects with the most number of other programs in the network of computer programs based on verifying a data communication between a dynamic port associated with said program and listening ports associated with one or more of the other programs;
   grouping, by the at least one hardware processor, a plurality of programs among the network of computer programs together that are one direct link to the application epicenter;
   identifying, by the at least one hardware processor, hardware components within the one or more servers that are used to operate the plurality of programs that are one direct link to the application epicenter;
   determining, by the at least one hardware processor, physical links between each of the hardware components;
   causing, by the at least one hardware processor, display of a graphical representation of the hardware components and their physical links in a digital display; and
   causing, by the at least one hardware processor, display of an overlay of the plurality of programs and the application epicenter over the graphical representation of the hardware components in the digital display, wherein positions of the programs and application epicenter correspond to which hardware components are directly supporting operation of the programs and application epicenter.

9. The method of claim 8, further comprising:
   determining a degree of health of each of the hardware components and their physical links by monitoring traffic flows of the physical links.

10. The method of claim 9, further comprising:
    causing display of the degree of health of each of the hardware components and their physical links by overlaying graphics representing the degree of health of each of the hardware components and their physical links over their respective graphical representations.

11. The method of claim 8, further comprising:
causing display of a graphical representation of traffic flows between the hardware components.

12. The method of claim 8, further comprising determining that at least one hardware component has a fault.

13. The method of claim 12, further comprising:
causing display of the fault by overlaying a graphical representation of the fault over the graphical representation of its corresponding hardware component.

14. The method of claim 8, further comprising accesing a user input defining the application epicenter, and wherein the plurality of programs is grouped based on the user input.

15. A computer readable medium having no transitory signals and comprising instructions that, when executed by a processor coupled to a memory and communicatively coupled to a network of computer programs operating on one or more servers, cause the processor to perform operations comprising:
connecting to listening ports running on the one or more servers;
receiving data from the listening ports;
responsive to receiving the data, determining an application epicenter by determining which program among the computer programs interconnects with the most number of other programs in the network of computer programs based on verifying a data communication between a dynamic port associated with said program and listening ports associated with one or more of the other programs;
grouping a plurality of programs among the network of computer programs together that are one direct link to the application epicenter;
identifying hardware components within the one or more servers that are used to operate the plurality of programs that are one direct link to the application epicenter;
determining physical links between each of the hardware components;
causing display of a graphical representation of the hardware components and their physical links in a digital display; and
causing display of an overlay of the plurality of programs and the application epicenter over the graphical representation of the hardware components in the digital display, wherein positions of the programs and application epicenter correspond to which hardware components are directly supporting operation of the programs and application epicenter.

16. The computer readable medium of claim 15, the operations further comprising:
determining a degree of health of each of the hardware components and their physical links by monitoring traffic flows of the physical links.

17. The computer readable medium of claim 16, the operations further comprising:
causing display of the degree of health of each of the hardware components and their physical links by overlaying graphics representing the degree of health of each of the hardware components and their physical links over their respective graphical representations.

18. The computer readable medium of claim 15, the operations further comprising:
causing display of a graphical representation of traffic flows between the hardware components.

19. The computer readable medium of claim 15, the operations further comprising:
determining that at least one hardware component has a fault.

20. The computer readable medium of claim 19, the operations further comprising:
causing display of the fault by overlaying a graphical representation of the fault over the graphical representation of its corresponding hardware component.

* * * * *